INVENTOR.
Cecil C. Hunnicutt
BY John A. Hamilton
Attorney.

INVENTOR.
Cecil C. Hunnicutt
BY John A. Hamilton
Attorney.

Oct. 17, 1967  C. C. HUNNICUTT  3,347,235
PERIODIC VACUUM-BREAKING MOTOR OPERATED
ROTARY VALVE IN A SURGICAL DEVICE

Filed Nov. 23, 1964  3 Sheets-Sheet 3

INVENTOR.
Cecil C. Hunnicutt
BY John A. Hamilton
Attorney.

United States Patent Office 3,347,235
Patented Oct. 17, 1967

3,347,235
PERIODIC VACUUM-BREAKING MOTOR OPERATED ROTARY VALVE IN A SURGICAL DEVICE
Cecil C. Hunnicutt, Sabetha, Kans., assignor to Instrument Research, Inc., Sabetha, Kans., a corporation of Kansas
Filed Nov. 23, 1964, Ser. No. 413,078
10 Claims. (Cl. 128—276)

ABSTRACT OF THE DISCLOSURE

This application discloses a periodic vacuum-breaking device for suction tubes inserted at one end into an orifice of the body of a medical patient and connected at its opposite end to a vacuum pump, for draining fluid from the patient's body. The device consists of a conduit interconnected into said tube intermediate the ends of said tube and vented to the atmosphere, a power-driven valve in said conduit and operable when driven to open periodically, means for adjusting the frequency with which said valve will be opened, visual means indicating the position of the valve in its operating cycle, and means for manually changing the position of the valve in its operating cycle at will.

---

This invention relates to new and useful improvements in vacuum-breaking devices, and has particular reference to such a device adapted for use in connection with drainage tubes inserted into the human body as a part of certain medical treatments.

It is common practice in various medical procedures to drain internal fluids from the human body by means of a flexible tube inserted through the nose, mouth, surgical incision or other bodily orifice into the internal bodily cavity desired, and connecting said tube to a vacuum pump, said tube passing through a bottle or the like for collecting the fluid. A common difficulty encountered in this procedure is that often the wall of an internal organ or a membrane or the like, will be drawn or sucked against the end of the tube within the patient's body, sealing it against the passage of air and thus preventing further operation of the drainage system, with possible danger to the patient. As a result, doctors are often required to leave instructions on the patient's chart for the nurse or other attendant to interrupt the vacuum at regular intervals, in order to allow the end of the suction tube to be separated from any portion of the patient's body which may have engaged and sealed said tube. This procedure is of course tedious and time-consuming, and is subject to human error in that the nurse in charge is often very busy and may forget to follow the schedule accurately.

Accordingly, the principal object of the present invention is the provision of a device adapted to be connected into the suction tube and including valve means for venting said line to the atmosphere at periodic intervals to break the vacuum for a pre-determined time, for the purpose set forth above.

Another object is the provision of a device of the character described which may be set to interrupt the vacuum at any of several different time intervals, as may be necessary or desirable in each case.

A further object is the provision of a device of the character described wherein its position in its cycle of operation may be determined visually at any time, and which may be manually shifted from any position in its cycle to any other position.

A still further object is the provision of a device of the character described which may be shut off, so as to provide a continuous, uninterrupted suction when desired, without disconnecting it from the suction line, but so arranged that it cannot be shut off with the suction line vented to atmosphere.

Other objects are simplicity and economy of construction, efficiency and dependability of operation, and adaptability for use in any application wherein periodic vacuum interruption may be desirable.

Figures 1, 2:
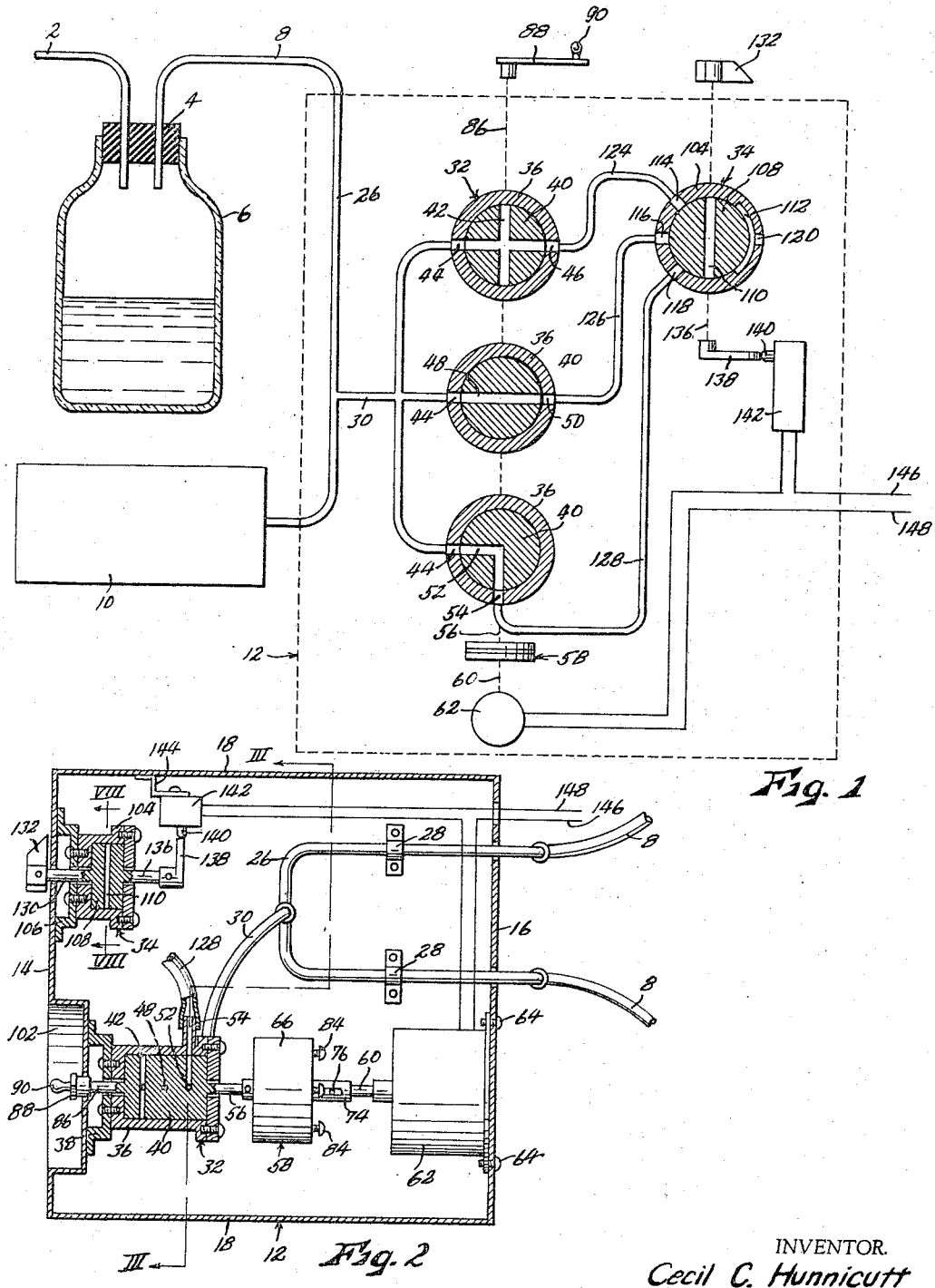
Figure 3:
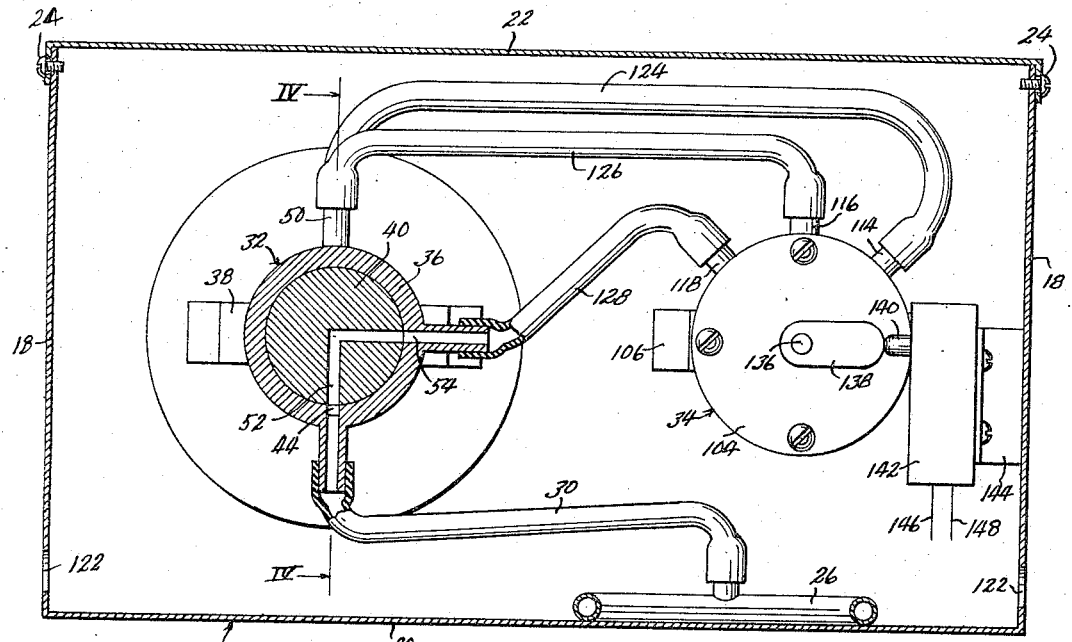
Figure 4:
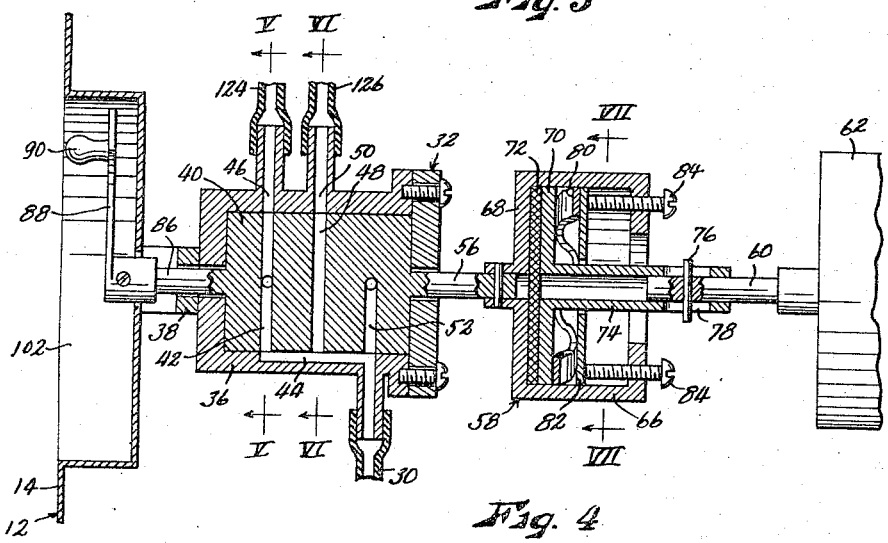
Figure 5:
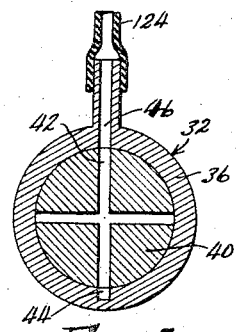
Figure 6:
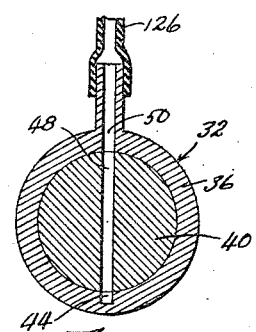
Figure 8:
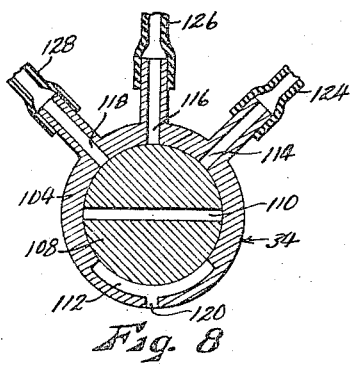
Figure 7:
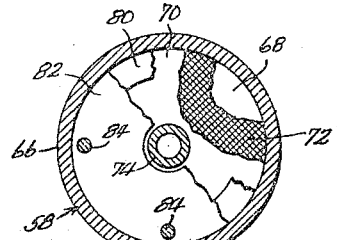
Figure 9:
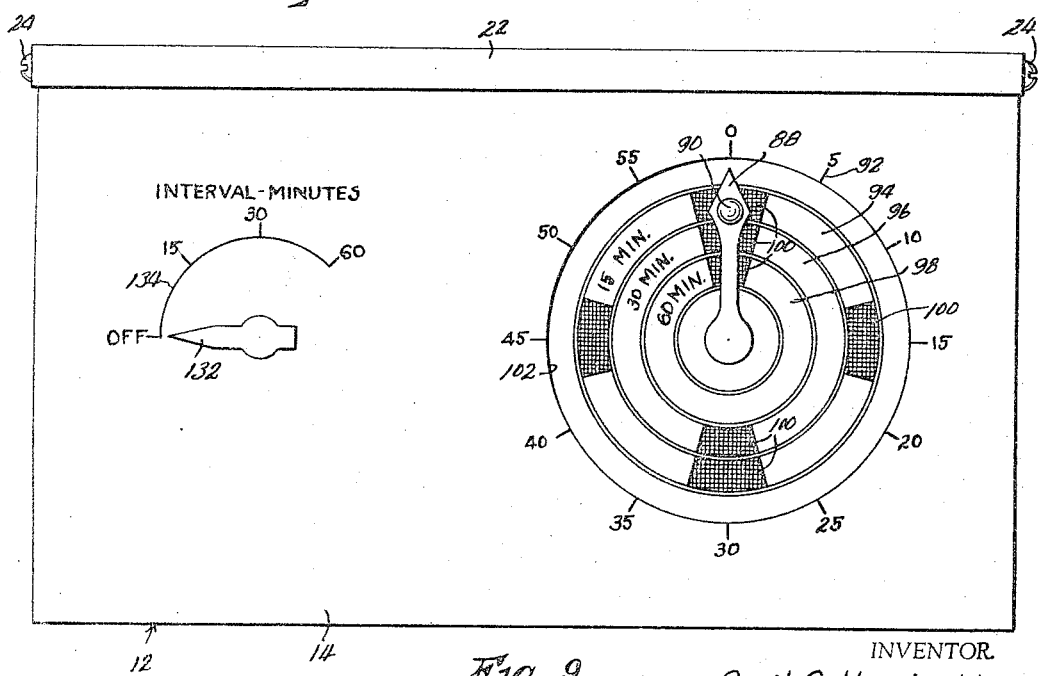

With these objects in view, as well as other objects which will appear in the course of the specification, reference will be had to the accompanying drawing, wherein:

FIG. 1 is a diagrammatic view of a vacuum system including a vacuum breaking device embodying the present invention, FIG. 2 is a horizontal sectional view taken through a housing enclosing the vacuum-breaking device as shown in FIG. 1, FIG. 3 is an enlarged sectional view taken on line III—III of FIG. 2, FIG. 4 is a fragmentary sectional view taken on line IV—IV of FIG. 3, FIG. 5 is a fragmentary sectional view taken on line V—V of FIG. 4, FIG. 6 is a fragmentary sectional view taken on line VI—VI of FIG. 4, FIG. 7 is a fragmentary sectional view taken on line VII—VII of FIG. 4, with parts broken away, FIG. 8 is an enlarged fragmentary sectional view taken on line VIII—VIII of FIG. 2, and FIG. 9 is an enlarged front elevational view of the housing of the vacuum-breaking device.

Like reference numerals apply to similar parts throughout the several views. Referring to FIG. 1, the numeral 2 applies to a flexible tube one end of which (not shown) is adapted to be inserted into the patient's body through the appropriate bodily orifice, the other end of said tube being inserted through the stopper 4 of a fluid collection bottle 6, and opening into said bottle. A second tube 8 is inserted through said stopper and opens into the bottle, the opposite end of tube 8 being interconnected with a powered vacuum pump 10, the details of which are common and well known in the art, and are therefore not here shown. The function of said pump is of course to maintain a vacuum in tubes 8 and 2, whereby to draw fluid from the patient's body and collect it in bottle 6.

The device forming the subject matter of the present invention is adapted to vent tube 8 to the atmosphere at periodic intervals, whereby to break the vacuum and allow the end of tube 2 within the patient's body to separate from any portion of the patient's body which may have sealed the end of the tube, and is enclosed in a suitable housing 12. As shown, said housing is formed of sheet metal and is rectilinear in form, having a front wall 14, a rear wall 16, side walls 18, a bottom wall 20, and a cover 22 secured releasably thereto by screws 24. Tube 8 extends through said housing, a section of said tube consisting of a U-shaped length 26 of rigid pipe secured to the bottom wall 20 of said housing by clips 28, the free ends of said pipe extending through rear housing wall 16 for connection respectively to bottle 6 and vacuum pump 10. Within the housing, a flexible tube 30 is interconnected at one end into pipe 26 and at its opposite end to a timer valve to be described below.

Disposed in the housing are a timer valve 32 and a selector valve 34, both of a rotary type. Timer valve 32 comprises a hollow cylindrical body member 36 affixed by bracket 38 to the inner surface of front housing wall 14 so that its axis is horizontal and at right angles to said wall, and a cylindrical plug 40 disposed snugly but rotatably in said body member. Said plug has three ports therethrough at longitudinally spaced apart points thereof.

One of said ports 42 is cross-shaped as best shown in FIG. 5, consisting of two right-angled, intersecting legs adapted as the plug is rotated to interconnect a port 44 at the bottom of the body member with a port 46 at the top of said body member. Obviously, this connection will occur four times during each revolution of the plug. The second port 48 of plug 40 comprises a single diametrical passage adapted, as the plug is rotated, to interconnect bottom port 44 with a port 50 at the top of the body member. This connection will occur twice for each revolution of the plug. The third port 52 of plug 40 constitutes an angled passage adapted to interconnect bottom port 44 with a port 54 at the side of the body member. This connection occurs only once during each rotation of the plug. Tube 30 is interconnected to the bottom port 44, which is common to all of the plug ports 42, 48 and 52.

Plug 40 is provided with a rearwardly projecting stub axle 56 which is connected through a friction clutch 58 to the output shaft 60 of an electric motor 62 affixed to rear housing wall 16 by screws 64. Said motor includes a geared speed reduction unit (not detailed) whereby shaft 60 is turned uniformly at a slow speed. For example, said motor could be an electric clock motor, with shaft 60 connected to the minute hand drive so as to complete one revolution per hour. In this case, drum port 42 connects its related body member ports once every 15 minutes, drum port 48 every 30 minutes, and drum port 52 once every hour. Friction clutch 58 may be of any suitable type, but as illustrated in FIGS. 4 and 7 consists of a hollow cylindrical body member 66 affixed coaxially to shaft 56 and having an end wall 68 forming one clutch plate, a second clutch plate 70 disposed within the body member adjacent end wall 68 with a friction disc 72 therebetween, said second disc having a hub 74 mounted on motor shaft 60 for axial sliding movement but restrained against rotation thereon by a pin 76 inserted through shaft 60 and engaged in a longitudinally elongated slot 78 formed in said hub, a spring washer 80 engaging the outer face of clutch plate 70, a rigid washer 82 engaging said spring washer, and a plurality of screws 84 threaded in body member 66 and engaging washer 82 to compress washer 80 and urge clutch plate 70 toward plate 68. The frictional torque of the clutch is sufficient to cause timer valve 32 to be driven by the motor, but may be overcome by the application of a greater manual torque to said valve.

Valve plug 40 is also provided with a forwardly extending stub axle 86 which extends forwardly through front housing wall 14 and has affixed to the outer end thereof a radially extending pointer 88 which also serves as a handle for turning valve plug 40 by overpowering the friction clutch, said pointer being provided with a finger knob 90 for this purpose. The pointer indicates the position of valve plug 40 in its rotation on a time scale 92 (see FIG. 9) imprinted on front housing wall 14, said scale as shown being predicated on the assumption that the valve completes one revolution per hour. Said pointer also indicates, on three concentric scales 94, 96 and 98 imprinted on the housing, whether each of the valve plug ports 42, 48 and 52 is at any particular moment interconnecting its associated valve body ports, each of said scales being provided with colored segments 100 indicating that such port interconnection has been made whenever the pointer overlies said segment. The duration of each such interconnection of course depends on the proportion of the plug and valve body ports, the duration in the structure shown being less than five minutes. This has been found satisfactory, but of course could be either shortened or lengthened as desired. Pointer 88 is disposed in a recess 102 of front housing wall 14, in order to prevent accidental movement thereof by brushing thereagainst.

Selector valve 34 comprises a hollow cylindrical body member 104 secured to the inner surface of housing wall 14 by a bracket 106, and a cylindrical plug 108 disposed snugly but rotatably therein. Said plug has a single diametrical port 110 which is adapted by rotation of the plug to interconnect a common port 112 at the bottom of body member 104 selectively with any one of three ports 114, 116 and 118 disposed in angularly spaced relation at the top of the body member. Common port 112 is vented to the atmosphere at 120, within housing 12, and side housing walls 18 are provided with holes 122 (see FIG. 3) for the admission of air. Ports 114, 116 and 118 are interconnected respectively to ports 46, 50 and 54 by flexible tubes 124, 126 and 128. Valve plug 108 also has an "off" position, as illustrated in the drawings wherein plug port 110 does not interconnect any of ports 114, 116 or 118 with vent port 112.

Selector valve plug 108 is provided with a forwardly extending stub axle 130 which extends through front housing wall 14 and has a pointer knob 132 affixed to the extended end thereof. The selector valve is manually operable by said knob, and the position of said valve is indicated by a scale 134 imprinted on the housing and read in connection with the knob. Said scale indicates the "off" position of the valve, and the respective positions thereof in which vent port 112 thereof is interconnected with ports 114, 116 and 118. Since these interconnections determine which of timer valve ports 42, 48 or 52 will be operative, and since each of the latter ports open at different time intervals, the positions of scale 134 are indexed with the corresponding time intervals. Valve plug 108 is also provided with a rearwardly extending stub axle 136 to the rearward end of which is affixed a radially extending cam arm 138 which is adapted to engage the operating button 140 of a normally-closed electric switch 142, whereby to open said switch only when the selector valve is turned to its "off" position. Said switch is mounted on housing wall 18 by bracket 144, and is electrically interconnected into one of the electric supply wires 146 and 148 supplying operating power to electric motor 62.

In operation, selector knob 132 is turned from its "off" position to the position on scale 134 indicating the time intervals at which it is desired to break the vacuum in the tube 2 which has been inserted into the patient's body, say 15 minute intervals. This turns cam 138 out of engagement with switch button 140, allowing switch 142 to close to activate motor 62, and causes plug port 110 of the selector valve to interconnect vent port 112 and body port 114 of the body member. Then, as timer valve plug 40 is rotated at one revolution per hour, plug port 42 of the timer valve will, at 15 minute intervals, interconnect body ports 44 and 46 of the timer valve, the duration of the interconnection being determined by the angular extent of the ports as described above. This allows air to enter vent port 120–112 of the selector valve and pass through ports 110 and 114, tube 124, ports 46, 42 and 44 of the timer valve, and tube 30 into suction line 8 of vacuum pump 10, thereby breaking the vacuum therein for the intended purposes. This cycle is repeated continuously as long as switch 142 is closed. Ports 48 and 52 of the timer valve are of course inoperative at this time, since the corresponding ports 116 and 118 of the selector valve are sealed. The operation is the same if selector knob 132 is set for 30 minute or 60 minute intervals, except that then either of selector valve ports 116 or 118 are then vented to atmosphere, activating either port 48 or port 52 of the timer valve to break the vacuum at the corresponding time intervals, as may be dictated by proper medical practice.

The exact position of the timer valve in its cycle of operation at any instant may be determined visually by reading the position of pointer 88 on scale 102. Also, it may be determined if the vacuum is broken at any instant by observing whether said pointer overlies one of the colored segments 100 of the scale 94, 96 or 98 corresponding to the time interval at which selector knob 132 has been set. The position of the timer valve in its operative cycle may be changed at will at any time, as for example to break the vacuum at any time an attendant may observe that the drainage system is not functioning, by grasping knob 90 of pointer 88 and exerting sufficient manual force thereon to overcome friction clutch 58 to rotate valve plug 40.

Operation of motor switch 142 by cam 138 provides a mechanical interlock rendering it impossible to shut off the vacuum-breaking device with the valves positioned to break the vacuum. This is important since the vacuum-breaking device may often be shut off when it is desired to provide continuous suction in the drainage system, without periodic interruption, and any possibility that it could be shut off with the suction line vented to atmosphere would render the drainage system completely inoperative.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. For use in connection with a medical drainage system including a suction line, one end of which is adapted to be inserted into a patient's body and having the opposite end thereof connected to a vacuum pump operable to produce a vacuum therein, a periodic vacuum-breaking device comprising:
   (a) a conduit adapted to be interconnected at one end into said suction line and having its opposite end vented to the atmosphere,
   (b) a power driven timer valve disposed in said conduit and operable as it is driven to open at periodic intervals in a cyclical operation,
   (c) power means operable to drive said valve,
   (d) a friction clutch interposed between said power means and said timer valve, and
   (e) manually operable means for moving said valve from any position in its cycle of operation to any other position by overpowering said friction clutch.

2. A periodic vacuum-breaking device as recited in claim 1 wherein said manually operable means comprises a pointer readable in connection with a fixed indicator scale to indicate the position of said valve in its cycle of operation.

3. A periodic vacuum-breaking device as recited in claim 1 with the addition of:
   (a) a second valve disposed in said conduit, said second valve being manually operable to open or closed positions.

4. A periodic vacuum-breaking device as recited in claim 3, and with the addition of:
   (a) means operable by said second valve to deactivate said power means only when said second valve is closed.

5. A periodic vacuum-breaking device as recited in claim 3 wherein said power means constitutes an electric motor having an operating electric circuit, and with the addition of:
   (a) an electric switch interconnected in said electric circuit, and
   (b) means operable by said second valve to open said switch only when said second valve is closed.

6. A periodic vacuum-breaking device as recited in claim 1 wherein said conduit is provided with a plurality of parallel-connected branches, each branch having one of said timer valves interconnected therein, said timer valves being operable to open at respectively different time intervals when driven at equal speeds, said power means being interconnected with all of said timer valves to drive them at equal speeds, and with the addition of:
   (a) a manually operable selector valve operable to close all but any selected one of said branches, independently of said timer valves.

7. A periodic vacuum-breaking device as recited in claim 6 wherein all of said timer valves constitute respectively different sets of ports formed in a rotatably driven plug mounted in a fixed valve body, and wherein said power means operates to rotate said valve plug.

8. A periodic vacuum-breaking device as recited in claim 6 wherein said selector valve additionally has an "off" position in which it closes all of said branch conduits, wherein said power means constitutes an electric motor having an operating electric circuit, and with the addition of:
   (a) an electric switch in said electric circuit, and
   (b) means operable by said selector valve to open said switch only when said selector switch is moved to said "off" position.

9. For use in connection with a medical drainage system including a suction line one end of which is adapted to be inserted into a patient's body and having the opposite end thereof connected to a vacuum pump operable to produce a vacuum therein, a periodic vacuum-breaking device comprising:
   (a) a housing,
   (b) a conduit adapted to be connected at one end into said suction line and having its opposite end vented to the atmosphere,
   (c) a rotary plug type valve mounted in said housing and interconnected in said conduit, said valve being operable as the plug thereof is rotated to open at predetermined angular positions,
   (d) an electric motor mounted in said housing and interconnected to the plug of said valve to cause rotation thereof at a predetermined speed, and
   (e) a pointer fixedly related to the plug of said valve and disposed externally of said housing, said pointer being readable in connection with a scale imprinted on said housing to indicate the angular position of said valve plug.

10. A periodic vacuum-breaking device as recited in claim 9 with the addition of:
    (a) a friction clutch interposed between said motor and said valve plug, said pointer constituting a handle whereby said valve plug may be manually rotated by overpowering said friction clutch.

References Cited

UNITED STATES PATENTS

| | | | |
|---|---|---|---|
| Re. 20,226 | 1/1937 | Drinker et al. | 128—30 |
| 1,979,981 | 11/1934 | McKesson | 128—30 |
| 2,087,491 | 7/1937 | Whitehurst | 128—297 |
| 2,351,828 | 6/1944 | Marsh | 128—278 |
| 3,016,055 | 1/1962 | Oldenburg | 128—278 |
| 3,042,042 | 7/1962 | Blanck | 128—276 |
| 3,142,298 | 7/1964 | Koski et al. | 128—276 |
| 3,191,600 | 6/1965 | Everett | 128—276 |

RICHARD A. GAUDET, *Primary Examiner.*

C. F. ROSENBAUM, *Assistant Examiner.*